US012635008B2

(12) United States Patent
Zhong

(10) Patent No.: US 12,635,008 B2
(45) Date of Patent: May 19, 2026

(54) RADIO RESOURCE CONTROL CONNECTION METHOD AND APPARATUS, AND TERMINAL

(71) Applicant: VIVO MOBILE COMMUNICATION CO., LTD., Guangdong (CN)

(72) Inventor: Tingting Zhong, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 368 days.

(21) Appl. No.: 18/323,632

(22) Filed: May 25, 2023

(65) Prior Publication Data

US 2023/0300910 A1 Sep. 21, 2023

Related U.S. Application Data

(63) Continuation of application No. PCT/CN2021/136951, filed on Dec. 10, 2021.

(30) Foreign Application Priority Data

Dec. 15, 2020 (CN) .......................... 202011482316.0

(51) Int. Cl.
| | |
|---|---|
| *H04W 76/10* | (2018.01) |
| *H04L 12/18* | (2006.01) |
| *H04W 68/02* | (2009.01) |

(52) U.S. Cl.
CPC ........... *H04W 76/10* (2018.02); *H04L 12/189* (2013.01); *H04W 68/02* (2013.01)

(58) Field of Classification Search
CPC ....... H04W 76/10; H04W 68/02; H04W 4/06; H04W 76/40; H04W 76/19; H04W 76/27; H04L 2/189

USPC .......................................................... 370/312
See application file for complete search history.

(56) References Cited

U.S. PATENT DOCUMENTS

| | | | | |
|---|---|---|---|---|
| 2018/0234894 A1 | 8/2018 | Jiang | | |
| 2020/0100312 A1* | 3/2020 | Hapsari | ................. | H04W 76/27 |
| 2020/0146053 A1 | 5/2020 | Tang et al. | | |
| 2020/0178113 A1* | 6/2020 | Jin | ......................... | H04W 76/11 |
| 2020/0305014 A1 | 9/2020 | Kim et al. | | |
| 2021/0105674 A1* | 4/2021 | Kim | .................. | H04W 74/0833 |

(Continued)

FOREIGN PATENT DOCUMENTS

| | | |
|---|---|---|
| CN | 106658758 A | 5/2017 |
| CN | 108307512 A | 7/2018 |
| CN | 108307322 B | 9/2019 |

(Continued)

OTHER PUBLICATIONS

Intel Corporation, Capture NR agreements into 36.331 for E-UTRA connected to 5GC, 3GPP TSG-RAN2 Meeting #103, R2-1811647, Aug. 20-24, 2018, Gothenburg, Sweden.

(Continued)

*Primary Examiner* — Jutai Kao
*Assistant Examiner* — Syed M Bokhari
(74) *Attorney, Agent, or Firm* — Foley & Lardner LLP

(57) ABSTRACT

This application discloses a radio resource control connection method and apparatus, and a terminal, belonging to the field of communication. The method includes: obtaining first information indicated by a network side; and performing a radio resource control connection establishment or resume procedure based on a first condition.

17 Claims, 4 Drawing Sheets

S201

Obtain first information indicated by a network side

S202

Perform a radio resource control connection establishment or resume procedure based on a first condition

(56) References Cited

U.S. PATENT DOCUMENTS

| | | | | |
|---|---|---|---|---|
| 2023/0171791 A1* | 6/2023 | Fujishiro | ............... | H04W 76/40 |
| | | | | 370/312 |
| 2023/0262423 A1* | 8/2023 | Fujishiro | ............... | H04W 76/20 |

FOREIGN PATENT DOCUMENTS

| | | | |
|---|---|---|---|
| CN | 113498221 A | 10/2021 |
| WO | 2019041099 A1 | 3/2019 |

OTHER PUBLICATIONS

CATT, "Priority Handling between Multicast Reception and RRC Connection Establishment/Resume", 3GPP TSG RAN WG2 Meeting #95bis, R2-166216, Oct. 10-14, 2016, Kaohsiung.
Qualcomm Inc, "NR Multicast-Broadcast services and configuration for UEs in different RRC states", 3GPP TSG-RAN WG2 Meeting #112e, R2-2009038, Revision of R2-2006795, Nov. 2-13, 2020, E-Meeting.

* cited by examiner

S301

Obtain first information indicated by a network side

S302

Perform a radio resource control connection establishment or resume procedure based on a priority of a third condition

400

Radio resource control connection apparatus    401

Obtaining module

402

Execution module

500

Communication device

501    Processor    Memory    502

RADIO RESOURCE CONTROL CONNECTION METHOD AND APPARATUS, AND TERMINAL

CROSS-REFERENCE TO RELATED APPLICATIONS

The present application is a continuation application of International Application No. PCT/CN2021/136951 filed on Dec. 10, 2021, which claims priority to Chinese Patent Application No. 202011482316.0, filed with the China National Intellectual Property Administration on Dec. 15, 2020 and entitled "RADIO RESOURCE CONTROL CONNECTION METHOD AND APPARATUS, AND TERMINAL", which are incorporated herein by reference in their entireties.

TECHNICAL FIELD

This application relates to the field of mobile communication technologies, and specifically, to a radio resource control connection method and apparatus, and a terminal.

BACKGROUND

In the multimedia broadcast and multicast service (MBMS) of long term evolution (LTE) technologies, a terminal, also referred to as a terminal device or a user equipment (UE), does not need to enter a radio resource control connected (RRC-Connected) state to receive MBMS-related signaling or user data, so that there is no radio resource control establishment procedure (RRC establishment procedure) or radio resource control resume procedure (RRC Resume procedure) for the MBMS service. In new radio (NR), some target services require that the UE may receive signaling or user data of an MBMS service, for example, a multicast broadcast service (MBS), only in RRC-connected, so that a UE in a non-radio resource control connected (non-RRCConnected) state needs to initiate an RRC establishment procedure and/or an RRC Resume procedure.

However, trigger conditions of the current NR RRC establishment procedure and RRC Resume procedure may not meet requirements of the target services, for example, a notification of an MBS session start is sent in a manner of SIB instead of paging, resulting in that the target services cannot be received by the UE.

SUMMARY

An objective of embodiments of this application is to provide a radio resource control connection method and apparatus, and a terminal, to resolve a problem that a target service cannot be received by a UE.

To resolve the foregoing technical problem, this application is implemented as follows:

According to a first aspect, a radio resource control connection method is provided and performed by a terminal, and the method includes: obtaining first information indicated by a network side; and performing a radio resource control connection establishment or resume procedure based on a first condition.

According to a second aspect, a radio resource control connection apparatus is provided, and the apparatus includes: an obtaining module, configured to obtain first information indicated by a network side; and an execution module, configured to perform a radio resource control connection establishment or resume procedure based on a first condition.

According to a third aspect, a terminal is provided, where the terminal includes a processor, a memory, and a program or an instruction stored in the memory and capable of being run on the processor, and the program or the instruction, when executed by the processor, implements the steps of the method according to the first aspect.

According to a fourth aspect, a readable storage medium is provided, where the readable storage medium stores a program or an instruction, and the program or the instruction, when executed by a processor, implements the steps of the method according to the first aspect, or implements the steps of the method according to the third aspect.

According to a fifth aspect, a chip is provided, where the chip includes a processor and a communication interface, the communication interface is coupled with the processor, and the processor is configured to run a program or an instruction of a network side device to implement the method according to the first aspect.

According to a sixth aspect, a program/program product is provided, where the program/program product is stored in a non-transitory storage medium, and the program/program product, when executed by a processor, implements the method according to the first aspect.

In the embodiments of this application, the first information indicated by the network side is obtained, and the radio resource control connection establishment or resume procedure is performed based on the first condition, so that a UE may be indicated by the network side to perform an NR RRC establishment procedure or an RRC Resume procedure, and in a case that a target service needs to be received, the network side may indicate the first information to the UE, so that the UE can perform the NR RRC establishment procedure or the RRC Resume procedure, and the UE can enter a connected state to receive and send data related to the target service.

DETAILED DESCRIPTION

The following clearly and completely describes the technical solutions in embodiments of this application with reference to the accompanying drawings in the embodiments of this application. Apparently, the described embodiments are some but not all of the embodiments of this application.

All other embodiments obtained by a person of ordinary skill in the art based on the embodiments of this application without creative efforts shall fall within the protection scope of this application.

In the specification and claims of this application, the terms "first", "second", and so on are intended to distinguish between similar objects but do not indicate a particular order or sequence. It should be understood that the data so used may be interchanged in an appropriate condition, so that the embodiments of this application described herein can be implemented in an order other than those illustrated or described herein. In addition, objects distinguished by "first" and "second" are usually of the same type, and a quantity of the objects is not limited, for example, one first object may be provided, or more than one first object may be provided. In addition, "and/or" used in this specification and the claims represents at least one of the connected objects, and the character "I" generally indicates an "or" relationship between the associated objects.

It should be noted that, the technologies described in the embodiments of this application are not limited to a long term evolution (LTE)/LTE-advanced (LTE-A) system, and may be further applied to other wireless communication systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. In the embodiments of this application, the terms "system" and "network" may usually be used interchangeably. The described technology can be applied to the systems and radio technologies mentioned above, and can also be applied to other systems and radio technologies. However, the following description describes a new radio (NR) system for an exemplary objective, and uses NR terms in most of the following description, although such technologies may also be applied to applications except an NR system application, such as a 6th generation (6G) communication system.

Figure 1:
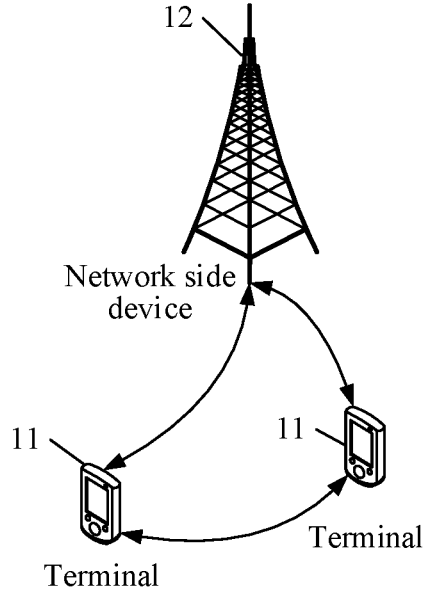
FIG. 1 is a block diagram of a wireless communication system to which an embodiment of this application may be applied.

FIG. 1 shows a block diagram of a wireless communication system that may be applied to an embodiment of this application; The wireless communication system includes a terminal 11 and a network side device 12. The terminal 11 may also be referred to as a terminal device or a UE. The terminal 11 may be a mobile phone, a tablet personal computer, a laptop computer also referred to as a notebook computer, a personal digital assistant (PDA), a palm personal computer, a netbook, an ultra-mobile personal computer (UMPC), a mobile Internet device (MID), a wearable device or a vehicle user equipment (VUE), a pedestrian user equipment (PUE), or other terminal side devices. The wearable device includes: a smart watch, an earphone, glasses, and the like. It should be noted that, a specific type of the terminal 11 is not limited in the embodiments of this application. The network side device 12 may be a base station or a core network, where the base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmitting receiving point (TRP), or another suitable term in the field. As long as the same technical effects can be achieved, the base station is not limited by a specific technical term. It should be noted that, a base station in the NR system is merely used as an example in the embodiments of this application, but a specific type of the base station is not limited.

The following describes the radio resource control connection method provided in the embodiments of this application in detail with reference to the accompanying drawings by using specific embodiments and application scenarios thereof.

Figure 2:
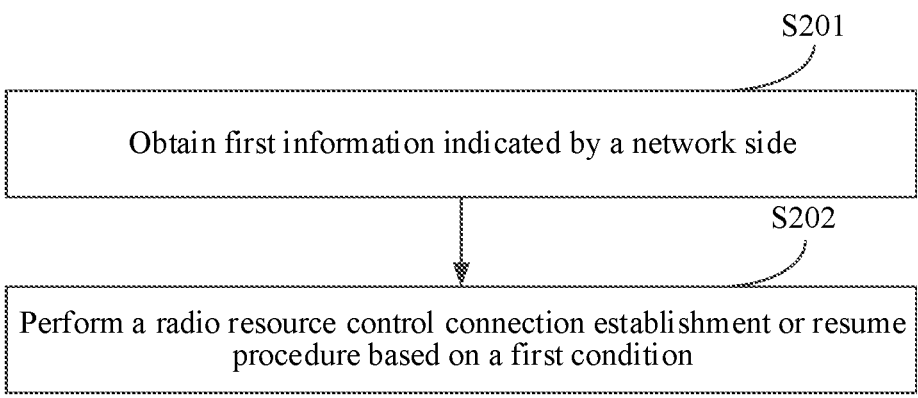
FIG. 2 is a schematic flowchart of a radio resource control connection method according to an embodiment of this application.

FIG. 2 is a schematic flowchart of a radio resource control connection method according to an embodiment of this application. The method may be performed by a terminal, in other words, the method may be performed by software or hardware installed on the terminal. As shown in FIG. 2, the method may include the following steps.

Step S201: Obtain first information indicated by a network side.

It should be understood that, the first information provided by the network side may include various content, and may include signaling data and/or user data. When the first information is MBS-related information, the first information may include: a session start/resume/deactive/change/active/stop/delete notification, an MBS announcement, and the like. The first information may be explicitly provided to a UE by the network side, and in this case, the network side needs to send the first information to the UE. Alternatively, the first information may be implicitly provided to the UE by the network side, and in this case, the network side may not send the first information to the UE.

In an implementation, the first information includes at least one of the following:

information about upper layers, for example, non-access stratum (NAS) signaling;

information about a radio resource control (RRC) layer, for example, a system message, an RRC message in a multicast control channel (MCCH), a Paging message, or the like;

information about a media access control (MAC) layer, for example, media access control control element (MAC CE) signaling; and information about a physical layer, for example, downlink control information (DCI).

In an implementation, the method may further include at least one of the following:

sending all or a part of the first information to lower layers of the terminal through the upper layers of the terminal. In an implementation, in a case that the first information includes the information about the upper layers (for example, NAS information), all or a part of the first information is sent to the lower layers of the terminal through the upper layers of the terminal. The part of the first information may include at least one of the following: a UE identity and identity information of an MBS service, for example, a temporary mobile group identity (TMGI). The lower layers may include the RRC layer.

All or a part of the first information is sent to the lower layers of the terminal through the upper layers of the terminal.

In an implementation, in a case that the first information includes the information about the RRC layer, all or a part of the first information is sent to the upper layers of the terminal through the RRC layer of the terminal. The part of the first information may include: a UE identity or identity information of an MBS service, for example, a TGMI. The upper layers may be NAS layers.

In an implementation, in a case that the first information includes the information about the MAC layer, all or a part of the first information is sent to the upper layers of the terminal through the MAC layer of the terminal. The part of the first information may include: a UE identity or identity information of an MBS service, for example, a TGMI. The upper layers may be the NAS layer and the RRC layer.

In an implementation, in a case that the first information includes the information about the physical layer, all or a part of the first information is sent to the upper layers of the terminal through the physical layer of the terminal. The part of the first information may include: a UE identity or identity information of an MBS service, for example, a TGMI. The upper layers may be the NAS layer and the RRC layer.

Step S202: Perform a radio resource control connection establishment or resume procedure based on a first condition.

If the UE is in an RRC-IDLE state, the radio resource control connection establishment procedure is performed based on the first condition. If the UE is in an RRC-inactive state, the radio resource control connection resume procedure is performed based on the first condition. Through the radio resource control connection establishment or resume procedure, the UE enters an RRC-Connected state of radio resource control, to send and/or receive first data.

It should be understood that, there are kinds of first data applicable to any signaling data or user data. For example, when the first data is MBS-related data, the first data may specifically be, user data of the MBS service; an uplink signaling message sent for obtaining scheduling information of the MB S service; signaling sent for performing multicast service session join procedure, for example, an mb session join request message; signaling sent for performing multicast service session leave procedure, for example, sending an mb session leave request message; and signaling sent for obtaining service area information of the multicast broadcast service, for example, a multicast service area request message.

Therefore, in the radio resource control connection method provided in this embodiment of the present invention, the terminal obtains the first information indicated by the network side, and performs the radio resource control connection establishment or resume procedure based on the first condition, the UE may be indicated by the network side to perform the NR RRC establishment procedure or the RRC Resume procedure, and in a case that a target service needs to be received, the network side may indicate the first information to the UE, so that the UE can perform the NR RRC establishment procedure or the RRC Resume procedure, and the UE can enter a connected state to receive and send data related to the target service, that is, the first data.

Figures 3, 4, 5:
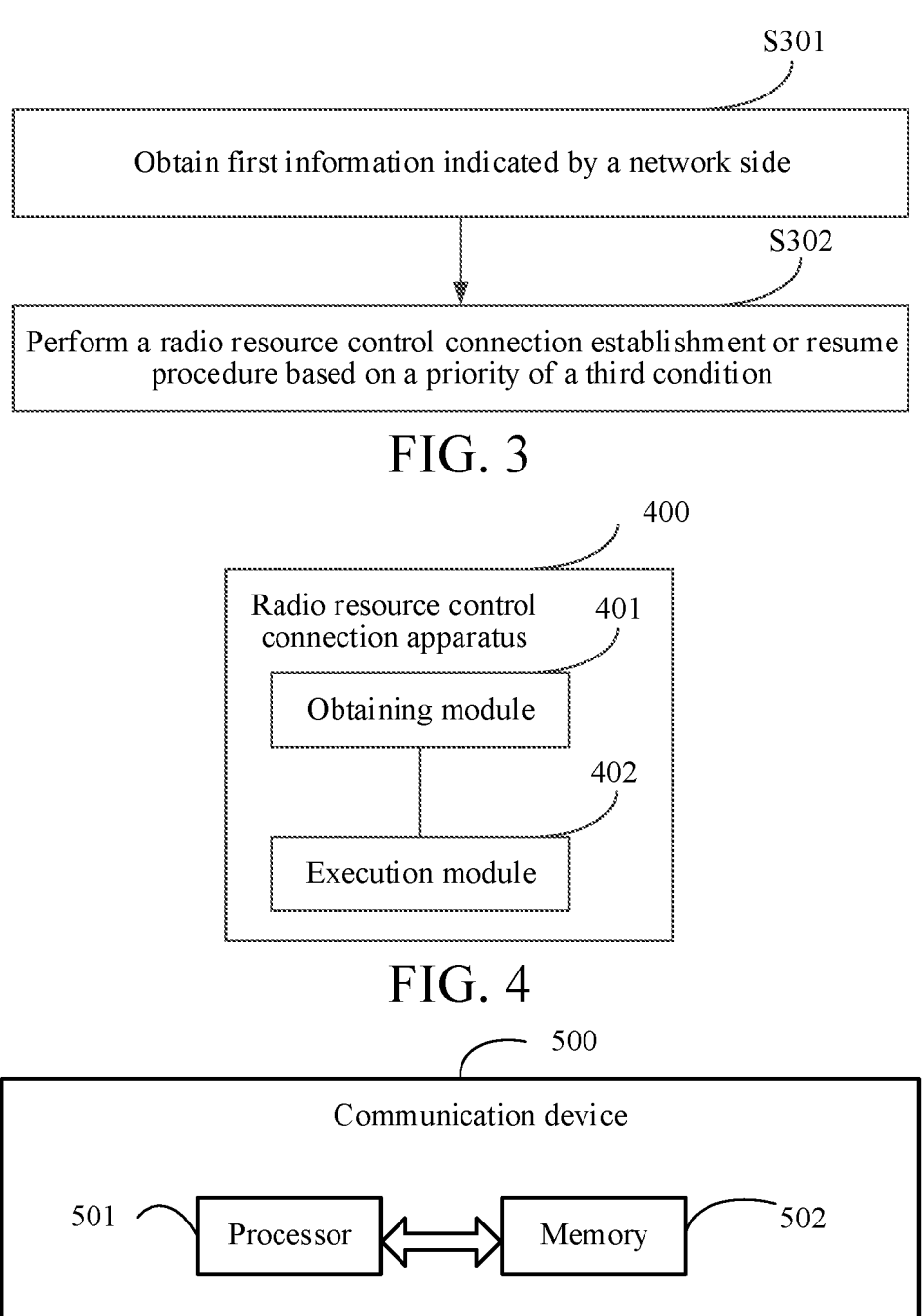
FIG. 3 is another schematic flowchart of a radio resource control connection method according to an embodiment of this application.
FIG. 4 is a schematic structural diagram of a radio resource control connection apparatus according to an embodiment of this application.
FIG. 5 is a schematic structural diagram of a communication device according to an embodiment of this application.

FIG. 3 is another schematic flowchart of a radio resource control connection method according to an embodiment of this application. The method may be performed by a terminal, in other words, the method may be performed by software or hardware installed on the terminal. As shown in FIG. 3, the method may include the following steps.

Step S301: Obtain first information indicated by a network side.

Step S301 may use descriptions same as or similar to those in step S201 in the embodiment of FIG. 2. To avoid repetition, details are not described herein again.

In an implementation, a first condition for a UE to initiate an RRC connection establishment or resume procedure may include at least one of a second condition and a third condition:

the second condition may include at least one of the following:

being triggered by a response to radio access network paging (triggered by response to NG-RAN paging);

being triggered by upper layers; and being triggered due to an access network notification area update (triggered due to an RNA update).

The being triggered by a response to NG-RAN paging, the being triggered by upper layers, and the RNA update may all trigger the RRC connection resume procedure, and a condition for triggering the RRC connection establishment procedure includes: being triggered by the upper layers.

The third condition may include at least one of the following:

being triggered by a response to the first information, for example, the resumption/establishment of the RRC connection is triggered by response to the first information (such as an MBS session notification);

being triggered by receiving the first data, for example, the resumption/establishment of the RRC connection is triggered to receive the first data (such as the MBS data); and being triggered by sending the first data, for example, the resumption/establishment of the RRC connection is triggered to send the first data (such as the MBS data).

Step S302: Perform the radio resource control connection establishment or resume procedure based on a priority of the third condition.

Step S302 may use descriptions same as or similar to those in step S202 in the embodiment of FIG. 2. To avoid repetition, details are not described herein again.

Each item in the second condition and the third condition are sequenced based on priorities of each item in the second condition and the third condition, the second condition or the third condition that is satisfied is determined according to a sequencing result, and an RRC connection establishment or resume procedure corresponding to the second condition or the third condition is performed.

In an implementation, the third condition may be determined first, and once the third condition is satisfied, the other conditions are directly skipped. In this case, step S302 includes:

in a case that the third condition is satisfied, perform a radio resource control connection establishment or resume procedure corresponding to the third condition, skip a procedure of determining whether the second condition is satisfied, and stop performing a radio resource control connection establishment or resume procedure corresponding to the second condition; or in a case that the third condition is not satisfied, determine whether the second condition is satisfied, and perform, in a case that the second condition is satisfied, a radio resource control connection establishment or resume procedure corresponding to the second condition.

For example:

if the resumption of the RRC connection is triggered by the third condition;

else if the resumption of the RRC connection is triggered by response to NG-RAN paging;

else if the resumption of the RRC connection is triggered by upper layers;

else if the resumption of the RRC connection is triggered due to an RNA update.

For the radio resource control connection establishment procedure, the third condition is considered as the first condition in the sequencing result. In a case that the third condition is not satisfied, whether the being triggered by upper layers in the second condition is satisfied is determined, or whether the upper layers provide an access category and at least one access identity for establishing the RRC connection is determined. An example of the sequencing result of each item in the second condition and the third condition is as follows:

if the establishment of the RRC connection is triggered by the third condition;

else if the upper layers provide an Access Category and one or more Access Identities upon requesting establishment of an RRC connection; or else if the establishment of the RRC connection is triggered by upper layers.

In an implementation, the UE determines the third condition finally; and once conditions before the third condition is satisfied, the third condition is directly skipped. In this case, step S302 includes:

in a case that the second condition is satisfied, perform a radio resource control connection establishment or resume procedure corresponding to the second condition, skip a procedure of determining whether the third condition is satisfied, and stop performing a radio resource control connection establishment or resume procedure corresponding to the third condition; or in a case that the second condition is not satisfied, determine whether the third condition is satisfied, and perform, in a case that the third condition is satisfied, a radio resource control connection establishment or resume procedure corresponding to the third condition.

For the radio resource control connection resume procedure, in the sequencing result, the third condition is sequenced behind each item in the second condition. An example of the sequencing result of each item in the second condition and the third condition is as follows:

if the resumption of the RRC connection is triggered by response to NG-RAN paging;

else if the resumption of the RRC connection is triggered by upper layers;

else if the resumption of the RRC connection is triggered due to an RNA update;

else if the resumption of the RRC connection is triggered by the third condition.

For the radio resource control connection establishment procedure, in the sequencing result, the third condition is sequenced behind the second condition. First, whether the being triggered by upper layers in the second condition is satisfied is determined, or whether the upper layers provide an access category and at least one access identity for establishing the RRC connection is determined, if neither satisfied, whether the third condition is satisfied is determined. An example of the sequencing result of each item in the second condition and the third condition is as follows:

if the upper layers provide an Access Category and one or more Access Identities upon requesting establishment of an RRC connection; or if the establishment of the RRC connection is triggered by upper layers;

else if the establishment of the RRC connection is triggered by the first condition.

In an implementation, the third condition and the being triggered by a response to radio access network paging in the second condition have the same priority. Step S302 includes:

in a case that the third condition or the being triggered by a response to radio access network paging in the second condition is satisfied, perform a radio resource control connection resume procedure corresponding to the third condition or a radio resource control connection resume procedure corresponding to the being triggered by a response to radio access network paging, skip a procedure of determining whether remaining conditions in the second condition are satisfied, and stop performing a radio resource control connection resume procedure corresponding to the remaining conditions; or in a case that neither the third condition nor the being triggered by a response to radio access network paging in the second condition is satisfied, determine whether remaining conditions in the second condition are satisfied, and perform, in a case that the remaining conditions in the second condition are satisfied, a radio resource control connection resume procedure corresponding to the remaining conditions.

For a sequence between the third condition and the being triggered by a response to radio access network paging in the second condition, determining may be first performed on the third condition, or determining may be first performed on the being triggered by a response to radio access network paging in the second condition.

For the radio resource control connection resume procedure, an example of the sequencing result of each item in the second condition and the third condition is as follows:

if the resumption of the RRC connection is triggered by response to NG-RAN paging or the resumption of the RRC connection is triggered by the third condition;

else if the resumption of the RRC connection is triggered by upper layers;

else if the resumption of the RRC connection is triggered due to an RNA update.

For another example:

if the resumption of the RRC connection is triggered by the third condition or the resumption of the RRC connection is triggered by response to NG-RAN paging;

else if the resumption of the RRC connection is triggered by upper layers;

else if the resumption of the RRC connection is triggered due to an RNA update.

In an implementation, step S302 includes:

in a case that the being triggered by a response to radio access network paging in the second condition is satisfied, perform a radio resource control connection resume procedure corresponding to the being triggered by a response to radio access network paging in the second condition; and skip a procedure of determining whether the third condition and remaining conditions in the second condition are satisfied, and stop performing a radio resource control connection resume procedure corresponding to the third condition and a radio resource control connection resume procedure corresponding to the remaining conditions;

in a case that the being triggered by a response to radio access network paging in the second condition is not satisfied, determine whether the being triggered by upper layers in the second condition is satisfied, and in a case that the being triggered by upper layers is satisfied, perform a radio resource control connection resume procedure corresponding to the being triggered by upper layers, skip a procedure of determining whether the third condition and remaining conditions in the second condition are satisfied, and stop performing a radio resource control connection resume procedure corresponding to the third condition and a radio resource control connection resume procedure corresponding to the remaining conditions in the second condition; or in a case that neither the being triggered by a response to radio access network paging nor the being triggered by upper layers in the second condition is satisfied, determine whether the third condition is satisfied, and in a case that the third condition is satisfied, perform a radio resource control connection resume procedure corresponding to the third condition, skip a procedure of determining whether remaining conditions in the second condition are satisfied, and stop performing a radio resource control connection resume procedure corresponding to the second condition.

For the radio resource control connection resume procedure, the third condition is considered as the third condition in the sequencing result. In a case that the second condition before the third condition is satisfied, a procedure of determining on the third condition is skipped. While if the third condition is satisfied, a procedure of determining on the subsequent remaining second condition is skipped. An example of the sequencing result of each item in the second condition and the third condition is as follows:

if the resumption of the RRC connection is triggered by response to NG-RAN paging;

else if the resumption of the RRC connection is triggered by upper layers;

else if the resumption of the RRC connection is triggered by the third condition;

else if the resumption of the RRC connection is triggered due to an RNA update.

In an implementation, step S302 includes:

in a case that the being triggered by a response to radio access network paging in the second condition is satisfied, perform a radio resource control connection resume procedure corresponding to the being triggered by a response to radio access network paging in the second condition, skip a procedure of determining whether the third condition and remaining conditions in the second condition are satisfied, and stop performing a radio resource control connection resume procedure corresponding to the third condition and a radio resource control connection resume procedure corresponding to the remaining conditions; or in a case that the being triggered by a response to radio access network paging in the second condition is not satisfied, determine whether the third condition is satisfied, and in a case that the third condition is satisfied, perform a radio resource control connection resume procedure corresponding to the third condition, skip a procedure of determining whether remaining conditions in the second condition are satisfied, and stop performing a radio resource control connection resume procedure corresponding to the remaining conditions.

For the radio resource control connection resume procedure, the third condition is considered as the second condition in the sequencing result. In a case that the second condition before the third condition is satisfied, a procedure of determining on the third condition is skipped. While if the third condition is satisfied, a procedure of determining on the subsequent remaining second condition is skipped. An example of the sequencing result of each item in the second condition and the third condition is as follows:

if the resumption of the RRC connection is triggered by response to NG-RAN paging;

else if the resumption of the RRC connection is triggered by the third condition;

else if the resumption of the RRC connection is triggered by upper layers;

else if the resumption of the RRC connection is triggered due to an RNA update.

Therefore, in the radio resource control connection method provided in this embodiment of the present invention, the terminal obtains the first information indicated by the network side, and determines on the second condition and the third condition in sequence based on the priority of the third condition, and considers the second condition or the third condition that is satisfied as the first condition, to perform the radio resource control connection establishment or resume procedure, thereby ensuring that trigger conditions of the NR RRC establishment procedure and the RRC Resume procedure meet the requirements of the target service, that is, trigger conditions are newly added to avoid a case that the target service cannot be received, and a problem of service conflicts caused by a plurality of trigger conditions after newly adding trigger conditions is resolved, so as to avoid a case that the UE cannot perform the RRC establishment procedure and the RRC Resume procedure, so that the UE can trigger and start the radio resource control connection establishment or resume procedure at any time, enter the connected state, and smoothly receive or send the first data of the target service.

It should be noted that, in the radio resource control connection method provided in this embodiment of this application, an execution subject may be a radio resource control connection apparatus, or a control module in the radio resource control connection apparatus that is configured to perform the radio resource control connection method. In an embodiment of this application, a radio resource control connection apparatus provided in this embodiment of this application is described by using an example in which the radio resource control connection apparatus performs the radio resource control connection method.

FIG. 4 is a schematic structural diagram of the radio resource control connection apparatus according to an embodiment of this application. As shown in FIG. 4, the apparatus 400 may include: an obtaining module 401 and an execution module 402.

The obtaining module 401 is configured to obtain first information indicated by a network side. The execution module 402 is configured to perform a radio resource control connection establishment or resume procedure based on a first condition.

Therefore, the radio resource control connection apparatus provided in this embodiment of the present invention determines the first condition by obtaining the first information indicated by the network side, and performs the radio resource control connection establishment or resume procedure based on the first condition, thereby ensuring that trigger conditions meet requirements of an MBS service, so that the UE can enter a connected state to receive and send data related to a target service.

In an implementation, the first information includes at least one of the following:

information about upper layers;

information about a radio resource control layer;

information about a media access control layer; and information about a physical layer.

In an implementation, the obtaining module 401 is configured to perform at least one of the following:

sending all or a part of the first information to lower layers of the terminal through the upper layers of the terminal; and sending all or a part of the first information to the upper layers of the terminal through the lower layers of the terminal.

In an implementation, the obtaining module is 401 configured to, in a case that the first information includes the information about the upper layers, send all or a part of the first information to the lower layers of the terminal through the upper layers of the terminal.

In an implementation, the obtaining module 401 is configured to perform at least one of the following: in a case that the first information includes the information about the radio resource control layer, sending all or a part of the first information to the upper layers of the terminal through the radio resource control layer of the terminal; in a case that the first information includes the information about the media access control layer, sending all or a part of the first information to the upper layers of the terminal through the media access control layer of the terminal; and in a case that the first information includes the information about the physical layer, sending all or a part of the first information to the upper layers of the terminal through the physical layer of the terminal.

In an implementation, the first condition includes at least one of a second condition and a third condition: the second condition includes at least one of the following:

being triggered by a response to radio access network paging;

being triggered by upper layers; and being triggered due to an access network notification area update; and the third condition includes at least one of the following:

being triggered by a response to the first information;

being triggered by receiving first data; and being triggered by sending the first data.

In an implementation, the execution module 402 is configured to perform the radio resource control connection establishment or resume procedure based on a priority of the third condition.

In an implementation, the execution module 402 is configured to:

in a case that the third condition is satisfied, perform a radio resource control connection establishment or resume procedure corresponding to the third condition, skip a procedure of determining whether the second condition is satisfied, and stop performing a radio resource control connection establishment or resume procedure corresponding to the second condition; or in a case that the third condition is not satisfied, determine whether the second condition is satisfied, and perform, in a case that the second condition is satisfied, a radio resource control connection establishment or resume procedure corresponding to the second condition.

In an implementation, the execution module 402 is configured to:

in a case that the second condition is satisfied, perform a radio resource control connection establishment or resume procedure corresponding to the second condition, skip a procedure of determining whether the third condition is satisfied, and stop performing a radio resource control connection establishment or resume procedure corresponding to the third condition; or in a case that the second condition is not satisfied, determine whether the third condition is satisfied, and perform, in a case that the third condition is satisfied, a radio resource control connection establishment or resume procedure corresponding to the third condition.

In an implementation, the execution module 402 is configured to:

in a case that the third condition or the being triggered by a response to radio access network paging in the second condition is satisfied, perform a radio resource control connection resume procedure corresponding to the third condition or a radio resource control connection resume procedure corresponding to the being triggered by a response to radio access network paging, skip a procedure of determining whether remaining conditions in the second condition are satisfied, and stop performing a radio resource control connection resume procedure corresponding to the remaining conditions; or in a case that neither the third condition nor the being triggered by a response to radio access network paging in the second condition is satisfied, determine whether remaining conditions in the second condition are satisfied, and perform, in a case that the remaining conditions in the second condition are satisfied, a radio resource control connection resume procedure corresponding to the remaining conditions.

In an implementation, the execution module 402 is configured to:

in a case that the being triggered by a response to radio access network paging in the second condition is satisfied, perform a radio resource control connection resume procedure corresponding to the being triggered by a response to radio access network paging in the second condition; and skip a procedure of determining whether the third condition and remaining conditions in the second condition are satisfied, and stop performing a radio resource control connection resume procedure corresponding to the third condition and a radio resource control connection resume procedure corresponding to the remaining conditions;

in a case that the being triggered by a response to radio access network paging in the second condition is not satisfied, determine whether the being triggered by upper layers in the second condition is satisfied, and in a case that the being triggered by upper layers is satisfied, perform a radio resource control connection resume procedure corresponding to the being triggered by upper layers, skip a procedure of determining whether the third condition and remaining conditions in the second condition are satisfied, and stop performing a radio resource control connection resume procedure corresponding to the third condition and a radio resource control connection resume procedure corresponding to the remaining conditions in the second condition; or in a case that neither the being triggered by a response to radio access network paging nor the being triggered by upper layers in the second condition is satisfied, determine whether the third condition is satisfied, and in a case that the third condition is satisfied, perform a radio resource control connection resume procedure corresponding to the third condition, skip a procedure of determining whether remaining conditions in the second condition are satisfied, and stop performing a radio resource control connection resume procedure corresponding to the second condition.

In an implementation, the execution module 402 is configured to:

in a case that the being triggered by a response to radio access network paging in the second condition is satisfied, perform a radio resource control connection resume procedure corresponding to the being triggered by a response to radio access network paging in the second condition, skip a procedure of determining whether the third condition and remaining conditions in the second condition are satisfied, and stop performing a radio resource control connection resume procedure corresponding to the third condition and a radio resource control connection resume procedure corresponding to the remaining conditions; or in a case that the being triggered by a response to radio access network paging in the second condition is not satisfied, determine whether the third condition is satisfied, and in a case that the third condition is satisfied, perform a radio resource control connection resume procedure corresponding to the third condition, skip a procedure of determining whether remaining conditions in the second condition are satisfied, and stop performing a radio resource control connection resume procedure corresponding to the remaining conditions.

Therefore, the radio resource control connection apparatus provided in this embodiment of the present invention obtains the first information indicated by the network side, and determines on the second condition and the third condition in sequence based on the priority of the third condition, and considers the second condition or the third condition that is satisfied as the first condition, to perform the radio resource control connection establishment or resume procedure, thereby ensuring that trigger conditions of the NR RRC establishment procedure and the RRC Resume procedure meet the requirements of the MBS service, that is, trigger conditions are newly added to avoid a case that the MBS cannot be received, and a problem of service conflicts caused by a plurality of trigger conditions after newly adding trigger conditions is resolved, so as to avoid a case that the UE cannot perform the RRC establishment procedure and the RRC Resume procedure, so that the UE can trigger and start the radio resource control connection establishment or resume procedure at any time, enter the connected state, and smoothly receive or send the first data.

The radio resource control connection apparatus in this embodiment of this application may be an apparatus, or may be a component, an integrated circuit, or a chip in the terminal. The apparatus may be a mobile terminal or may be a non-mobile terminal. For example, the mobile terminal may include, but not limited to, the foregoing enumerated types of the terminal 11, and the non-mobile terminal may be a server, a network attached storage (NAS), a personal computer (PC), a television (TV), a teller machine, a self-service machine, or the like. This is not specifically limited in this embodiment of this application.

The radio resource control connection apparatus in this embodiment of this application may be an apparatus with an operating system. The operating system may be an Android operating system, may be an ios operating system, or may be another possible operating system, and is not specifically limited in the embodiments of this application.

The radio resource control connection apparatus provided in this embodiment of this application can implement processes implemented by the method embodiment shown in FIG. 2 to FIG. 3, and achieve the same technical effects. To avoid repetition, details are not described herein again.

Optionally, as shown in FIG. 5, an embodiment of this application further provides a communication device 500, including a processor 501, a memory 502, and a program or an instruction stored in the memory 502 and capable of being run on the processor 501. For example, in a case that the communication device 500 is a terminal, the program or the instruction, when executed by the processor 501, implements the processes of the embodiments of the foregoing radio resource control connection method, and can achieve the same technical effects. When the communication device 500 is a network side device, the program or the instruction, when executed by the processor 501, implements the processes of the foregoing embodiments of the radio resource control connection method, and the same technical effects can be achieved. To avoid repetition, details are not described herein again.

Figure 6:
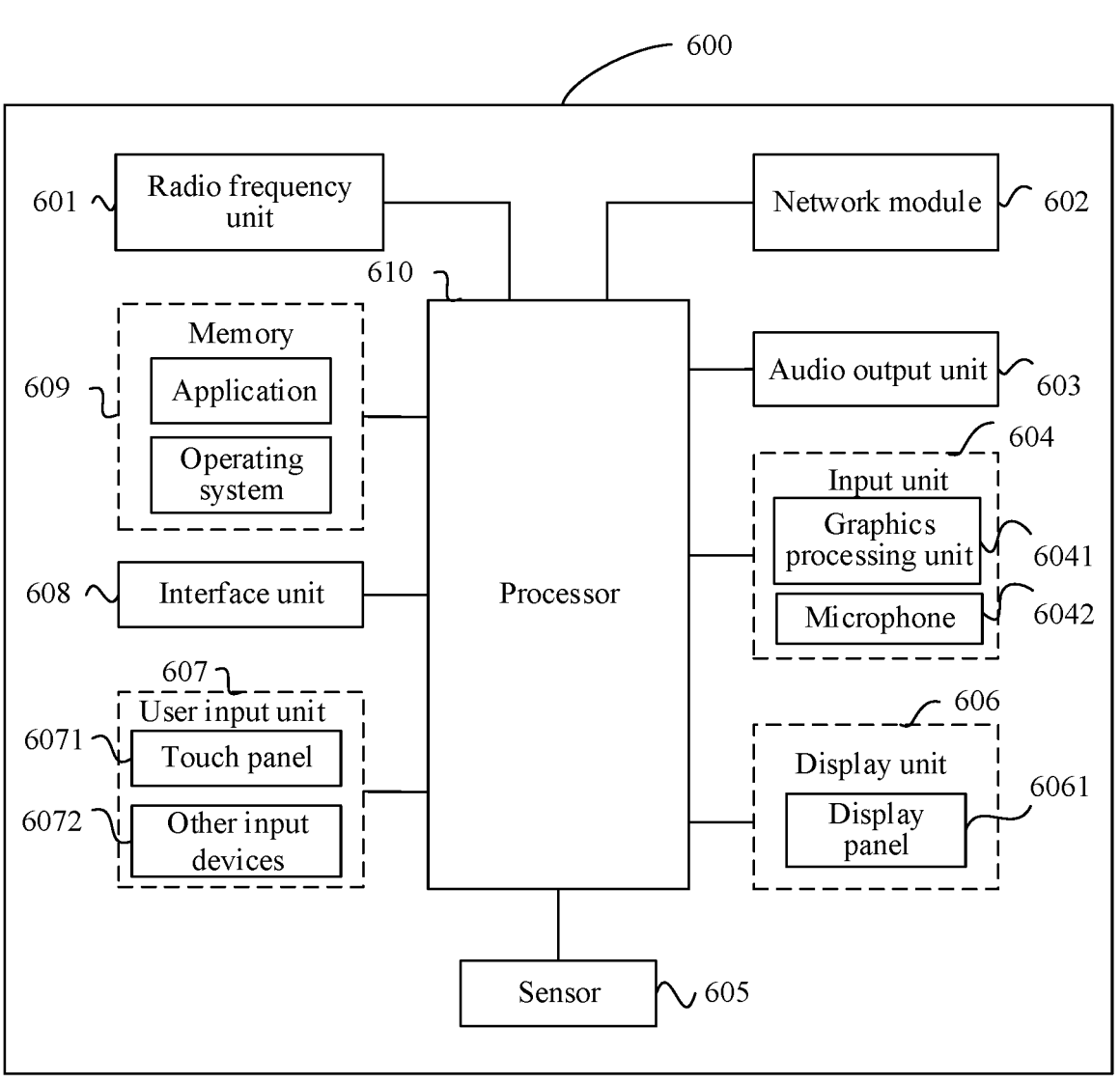
FIG. 6 is a schematic diagram of a hardware structure of a terminal for implementing an embodiment of this application.

FIG. 6 is a schematic diagram of a hardware structure of a terminal for implementing an embodiment of this application.

The terminal 600 includes but is not limited to: components such as a radio frequency unit 601, a network module 602, an audio output unit 603, an input unit 604, a sensor 605, a display unit 606, a user input unit 607, an interface unit 608, a memory 609, and a processor 610.

A person skilled in the art may understand that, the terminal 600 may further include a power supply (such as a battery) for supplying power to the components. The power supply may be logically connected to the processor 610 by using a power management system, thereby implementing functions such as charging, discharging, and power consumption management by using the power supply management system. The terminal structure shown in FIG. 6 constitutes no limitation on the terminal, and the terminal may include more or fewer components than those shown in the figure, or some components may be combined, or a different component deployment may be used. Details are not described herein again.

It should be understood that, in this embodiment of this application, the input unit 604 may include a graphics processing unit (GPU) 6041 and a microphone 6042. The graphics processing unit 6041 performs processing on image data of a static picture or a video that is obtained by an image acquisition device (for example, a camera) in a video acquisition mode or an image acquisition mode. The display unit 606 may include a display panel 6061, the display panel 6061 may be configured in a form such as a liquid crystal display or an organic light-emitting diode. The user input unit 607 includes a touch panel 6071 and another input device 6072. The touch panel 6071 is also referred to as a touchscreen. The touch panel 6071 may include two parts: a touch detection apparatus and a touch controller. The another input device 6072 may include, but not limited to, a physical keyboard, a functional key (such as a volume control key or a switch key), a track ball, a mouse, and a joystick. Details are not described herein again.

In this embodiment of this application, after the radio frequency unit 601 receives downlink data from a network side device, the downlink data is sent to the processor 610 for processing. In addition, uplink data is sent to the network side device. The radio frequency unit 601 usually includes but is not limited to an antenna, at least one amplifier, a transceiver, a coupler, a low noise amplifier, a duplexer, and the like.

The memory 609 may be configured to store a software program or an instruction and various data. The memory 609 may mainly include a program storage or instruction area and a data storage area. The program storage or instruction area may store an operating system, an application or an instruction required by at least one function (for example, a sound playing function and an image playing function), or the like. In addition, the memory 609 may include a cache random access memory, and may further include a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one magnetic disk storage device, a flash storage device, or other non-volatile solid-state storage devices.

The processor 610 may include one or more processing units. Optionally, the processor 610 may integrate an application processor and a modem processor. The application processor mainly processes an operating system, a user interface, an application or an instruction, and the like. The modem processor mainly processes wireless communication, such as a baseband processor. It may be understood that the modem processor may either not be integrated into the processor 610.

The radio frequency unit 601 is configured to obtain first information indicated by a network side.

The processor 610 is configured to perform a radio resource control connection establishment or resume procedure based on a first condition.

Therefore, the first condition is determined by obtaining the first information indicated by the network side; and the radio resource control connection establishment or resume procedure is performed based on the first condition, thereby ensuring that trigger conditions meet requirements of an MBS service, so that the UE can enter a connected state to receive and send data related to a target service.

Optionally, the processor 610 is further configured to perform the radio resource control connection establishment or resume procedure based on a priority of a third condition.

Optionally, the processor 610 is further configured to, in a case that the third condition is satisfied, perform a radio resource control connection establishment or resume procedure corresponding to the third condition, skip a procedure of determining whether a second condition is satisfied, and stop performing a radio resource control connection establishment or resume procedure corresponding to the second condition; or in a case that the third condition is not satisfied, determine whether the second condition is satisfied, and perform, in a case that the second condition is satisfied, a radio resource control connection establishment or resume procedure corresponding to the second condition.

Optionally, the processor 610 is further configured to, in a case that the second condition is satisfied, perform an establishment procedure or a radio resource control connection resume procedure corresponding to the second condition, skip a procedure of determining whether the third condition is satisfied, and stop performing an establishment procedure or a radio resource control connection resume procedure corresponding to the third condition; or in a case that the second condition is not satisfied, determine whether the third condition is satisfied, and perform, in a case that the third condition is satisfied, a radio resource control connection establishment or resume procedure corresponding to the third condition.

Optionally, the processor 610 is further configured to, in a case that the third condition or the being triggered by a response to radio access network paging in the second condition is satisfied, perform a radio resource control connection resume procedure corresponding to the third condition or a radio resource control connection resume procedure corresponding to the being triggered by a response to radio access network paging, skip a procedure of determining whether remaining conditions in the second condition is satisfied, and stop performing a radio resource control connection resume procedure corresponding to the remaining conditions; or in a case that neither the third condition nor the being triggered by a response to radio access network paging in the second condition is satisfied, determine whether remaining conditions in the second condition are satisfied, and perform, in a case that the remaining conditions in the second condition are satisfied, a radio resource control connection resume procedure corresponding to the remaining conditions.

Optionally, the processor 610 is further configured to, in a case that the being triggered by a response to radio access network paging in the second condition is satisfied, perform a radio resource control connection resume procedure corresponding to the being triggered by a response to radio access network paging in the second condition; and skip a procedure of determining whether the third condition and remaining conditions in the second condition are satisfied, and stop performing a radio resource control connection resume procedure corresponding to the third condition and a radio resource control connection resume procedure corresponding to the remaining conditions;

in a case that the being triggered by a response to radio access network paging in the second condition is not satisfied, determine whether the being triggered by upper layers in the second condition is satisfied, and in a case that the being triggered by upper layers is satisfied, perform a radio resource control connection resume procedure corresponding to the being triggered by upper layers, skip a procedure of determining whether the third condition and remaining conditions in the second condition are satisfied, and stop performing a radio resource control connection resume procedure corresponding to the third condition and a radio resource control connection resume procedure corresponding to the remaining conditions in the second condition; or in a case that neither the being triggered by a response to radio access network paging nor the being triggered by upper layers in the second condition is satisfied, determine whether the third condition is satisfied, and in a case that the third condition is satisfied, perform a radio resource control connection resume procedure corresponding to the third condition, skip a procedure of determining whether remaining conditions in the second condition are satisfied, and stop performing a radio resource control connection resume procedure corresponding to the second condition.

Optionally, the processor 610 is further configured to, in a case that the third condition or the being triggered by a response to radio access network paging in the second condition is satisfied, perform a radio resource control connection resume procedure corresponding to the being triggered by a response to radio access network paging in the second condition, skip a procedure of determining whether the third condition and remaining conditions in the second condition are satisfied, and stop performing a radio resource control connection resume procedure corresponding to the third condition and a radio resource control connection resume procedure corresponding to the remaining conditions; or in a case that the being triggered by a response to radio access network paging in the second condition is not satisfied, determine whether the third condition is satisfied, and in a case that the third condition is satisfied, perform a radio resource control connection resume procedure corresponding to the third condition, skip a procedure of determining whether remaining conditions in the second condition are satisfied, and stop performing a radio resource control connection resume procedure corresponding to the remaining conditions.

Therefore, the first information indicated by the network side is obtained, and determining on the second condition and the third condition in sequence is performed based on the priority of the third condition, and the second condition or the third condition that is satisfied is considered as the first condition, to perform the radio resource control connection establishment or resume procedure, thereby ensuring that trigger conditions of the NR RRC establishment procedure and the RRC Resume procedure meet the requirements of the MBS service, that is, trigger conditions are newly added to avoid a case that the MBS cannot be received, and a problem of service conflicts caused by a plurality of trigger conditions after newly adding trigger conditions is resolved, so as to avoid a case that the UE cannot perform the RRC establishment procedure and the RRC Resume procedure, so that the UE can trigger and start the radio resource control connection establishment or resume procedure at any time, enter the connected state, and smoothly receive or send the first data.

An embodiment of this application further provides a readable storage medium, where the readable storage medium stores a program or an instruction, and the program or the instruction, when executed by a processor, implements the processes of the embodiments of the radio resource control connection method, and can achieve the same technical effects. To avoid repetition, details are not described herein again.

The processor is the processor in the terminal of the foregoing embodiments. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communication interface, the communication interface is coupled with the processor, and the processor is configured to run a program or an instruction of a network side device, to implement the processes of the embodiments of the radio resource control connection method, and can achieve the same technical effects. To avoid repetition, details are not described herein again.

It should be understood that, the chip mentioned in this embodiment of this application may also be referred to as a system-level chip, a system chip, a chip system, a system-on-chip, or the like.

An embodiment of this application further provides a program/program product, where the program/program product is stored in a non-transitory storage medium, and the program/program product, when executed by a processor, implements the processes of the embodiments of the foregoing radio resource control connection method, and can achieve the same technical effects. To avoid repetition, details are not described herein again.

It should be noted that, in this specification, terms "comprise", "include", and any variants thereof are intended to cover a non-exclusive inclusion. Therefore, a process, a method, an object, or an apparatus that includes a series of elements only includes such elements, but also includes other elements not specified expressly, or may include inherent elements of the process, method, object, or apparatus. Without more limitations, elements defined by the sentence "including one" does not exclude that there are still other same elements in the processes, methods, objects, or apparatuses that include such elements. In addition, it should be noted that, the scope of the method and the apparatus in the embodiments of this application is not limited to a shown sequence or a discussed sequence to perform functions, and may further include performing functions in a basically simultaneous manner or a converse sequence based on the involved functions, for example, the described method may be performed in a sequence different from the description, and various steps may be added, removed, or combined. In addition, features described by referring to some examples may be combined in other examples.

Through the foregoing description in the foregoing implementations, a person skilled in the art can clearly learn that the foregoing embodiment methods may be implemented by using software in combination with a necessary universal hardware platform. Certainly, the embodiment methods may be implemented by using hardware, but the former is a better implementation in many cases. Based on such an understanding, the technical solutions of this application essentially or the part contributing to the prior art may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, a network device, or the like) to perform the methods described in the embodiments of this application.

The embodiments of this application have been described above with reference to the accompanying drawings. This application is not limited to the specific embodiments described above, and the specific embodiments described above are merely exemplary and not limitative. Those of ordinary skill in the art may make various variations under the teaching of this application without departing from the spirit of this application and the protection scope of the claims, and such variations shall all fall within the protection scope of this application.

What is claimed is:

1. A radio resource control connection method, performed by a terminal, the method comprising:

obtaining first information indicated by a network side, wherein the first information comprises Multicast Broadcast Service (MBS)-related information; and performing a radio resource control connection establishment or resume procedure based on a first condition;

wherein the first condition comprises at least one of a second condition or a third condition;

wherein the second condition comprises at least one of:

being triggered by a response to radio access network paging;

being triggered by upper layers; or being triggered due to an access network notification area update;

wherein the third condition comprises at least one of:

being triggered by a response to the first information;

being triggered by receiving first data; or being triggered by sending the first data;

wherein performing the radio resource control connection establishment or resume procedure based on the first condition comprises:

in a case that the third condition or the being triggered by the response to radio access network paging in the second condition is satisfied, performing a radio resource control connection resume procedure corresponding to the third condition or performing a radio resource control connection resume procedure corresponding to the being triggered by the response to radio access network paging, skipping a procedure of determining whether remaining conditions in the second condition are satisfied, and stopping performing a radio resource control connection resume procedure corresponding to the remaining conditions;

in a case that neither the third condition nor the being triggered by the response to radio access network paging in the second condition is satisfied, determining whether remaining conditions in the second condition are satisfied, and performing, in a case that the remaining conditions in the second condition are satisfied, a radio resource control connection resume procedure corresponding to the remaining conditions.

2. The method according to claim 1, wherein performing the radio resource control connection establishment or resume procedure based on the first condition comprises:

performing the radio resource control connection establishment or resume procedure based on a priority of the third condition.

3. The method according to claim 1, wherein the first information comprises at least one of the following:

a session start information;

resume information;

deactive information;

change information;

active information;

stop information;

delete notification; or an Multicast Broadcast Service (MBS) announcement.

4. The method according to claim 1, wherein the first information further comprises at least one of:

information about upper layers;

information about a radio resource control (RRC) layer;

information about a media access control layer; or information about a physical layer.

5. The method according to claim 4, wherein after obtaining the first information indicated by the network side, the method further comprises at least one of the following:

sending all or a part of the first information to lower layers of the terminal through the upper layers of the terminal; or sending all or a part of the first information to the upper layers of the terminal through the lower layers of the terminal.

6. The method according to claim 5, wherein the sending all or a part of the first information to lower layers of the terminal through the upper layers of the terminal comprises at least one of the following:

in a case that the first information comprises the information about the upper layers, sending all or a part of the first information to the lower layers of the terminal through the upper layers of the terminal.

7. The method according to claim 5, wherein the sending all or a part of the first information to the upper layers of the terminal through the lower layers of the terminal comprises at least one of the following:

in a case that the first information comprises the information about the radio resource control layer, sending all or a part of the first information to the upper layers of the terminal through the radio resource control layer of the terminal;

in a case that the first information comprises the information about the media access control layer, sending all or a part of the first information to the upper layers of the terminal through the media access control layer of the terminal; or in a case that the first information comprises the information about the physical layer, sending all or a part of the first information to the upper layers of the terminal through the physical layer of the terminal.

8. The method according to claim 4, wherein in a case that the first information comprises the information about the radio resource control layer, the performing the radio resource control connection establishment or resume procedure comprises:

sending all or a part of the first information to the upper layers of the terminal through the RRC layer of the terminal.

9. The method according to claim 8, wherein the part of the first information comprises:

a User Equipment (UE) identity;

identity information of an MBS service;

a Temporary Group Mobile Identity (TGMI);

wherein the upper layers are Non-access Stratum (NAS) layers.

10. The method according to claim 4, wherein in a case that the first information comprises the information about the radio resource control layer, the first information comprises at least one of the following:

a system message;

an RRC message in a multicast control channel (MCCH); or a Paging message.

11. A terminal, comprising a processor, a memory, and a program or an instruction stored in the memory and capable of being run on the processor, wherein the program or the instruction, when executed by the processor, implements:

obtaining first information indicated by a network side, wherein the first information comprises Multicast Broadcast Service (MBS)-related information; and performing a radio resource control connection establishment or resume procedure based on a first condition;

wherein the first condition comprises at least one of a second condition or a third condition;

wherein the second condition comprises at least one of:

being triggered by a response to radio access network paging;

being triggered by upper layers; or being triggered due to an access network notification area update;

wherein the third condition comprises at least one of:

being triggered by a response to the first information;

being triggered by receiving first data; or being triggered by sending the first data;

wherein the program or the instruction, when executed by the processor, implements:

in a case that the third condition or the being triggered by the response to radio access network paging in the second condition is satisfied, performing a radio resource control connection resume procedure corresponding to the third condition or performing a radio resource control connection resume procedure corresponding to the being triggered by the response to radio access network paging, skipping a procedure of determining whether remaining conditions in the second condition are satisfied, and stopping performing a radio resource control connection resume procedure corresponding to the remaining conditions;

in a case that neither the third condition nor the being triggered by the response to radio access network paging in the second condition is satisfied, determining whether remaining conditions in the second condition are satisfied, and performing, in a case that the remaining conditions in the second condition are satisfied, a radio resource control connection resume procedure corresponding to the remaining conditions.

12. The terminal according to claim 11, wherein after the obtaining first information indicated by the network side, the terminal further implements:

sending all or a part of the first information to lower layers of the terminal through the upper layers of the terminal; and sending all or a part of the first information to the upper layers of the terminal through the lower layers of the terminal.

13. The terminal according to claim 11, wherein the performing the radio resource control connection establishment or resume procedure based on the first condition comprises:

performing the radio resource control connection establishment or resume procedure based on a priority of the third condition.

14. The terminal according to claim 11, wherein the first information comprises at least one of the following:

a session start information;

resume information;

deactive information;

change information;

active information;

stop information;

delete notification;

an MBS announcement.

15. The terminal according to claim 11, wherein the first information further comprises at least one of:

information about upper layers;

information about a radio resource control layer;

information about a media access control layer; or information about a physical layer.

16. The terminal according to claim 15, wherein in a case that the first information comprises the information about the radio resource control layer, the terminal further implements:

sending all or a part of the first information to the upper layers of the terminal through the RRC layer of the terminal.

17. The terminal according to claim 15, wherein in a case that the first information comprises the information about the radio resource control layer, the first information comprises at least one of the following:

a system message;

an RRC message in a multicast control channel (MCCH); or a Paging message.

* * * * *